Feb. 4, 1936. D. B. BUDD ET AL 2,029,518
GARDEN ROLLER MANUFACTURE
Filed Aug. 23, 1934
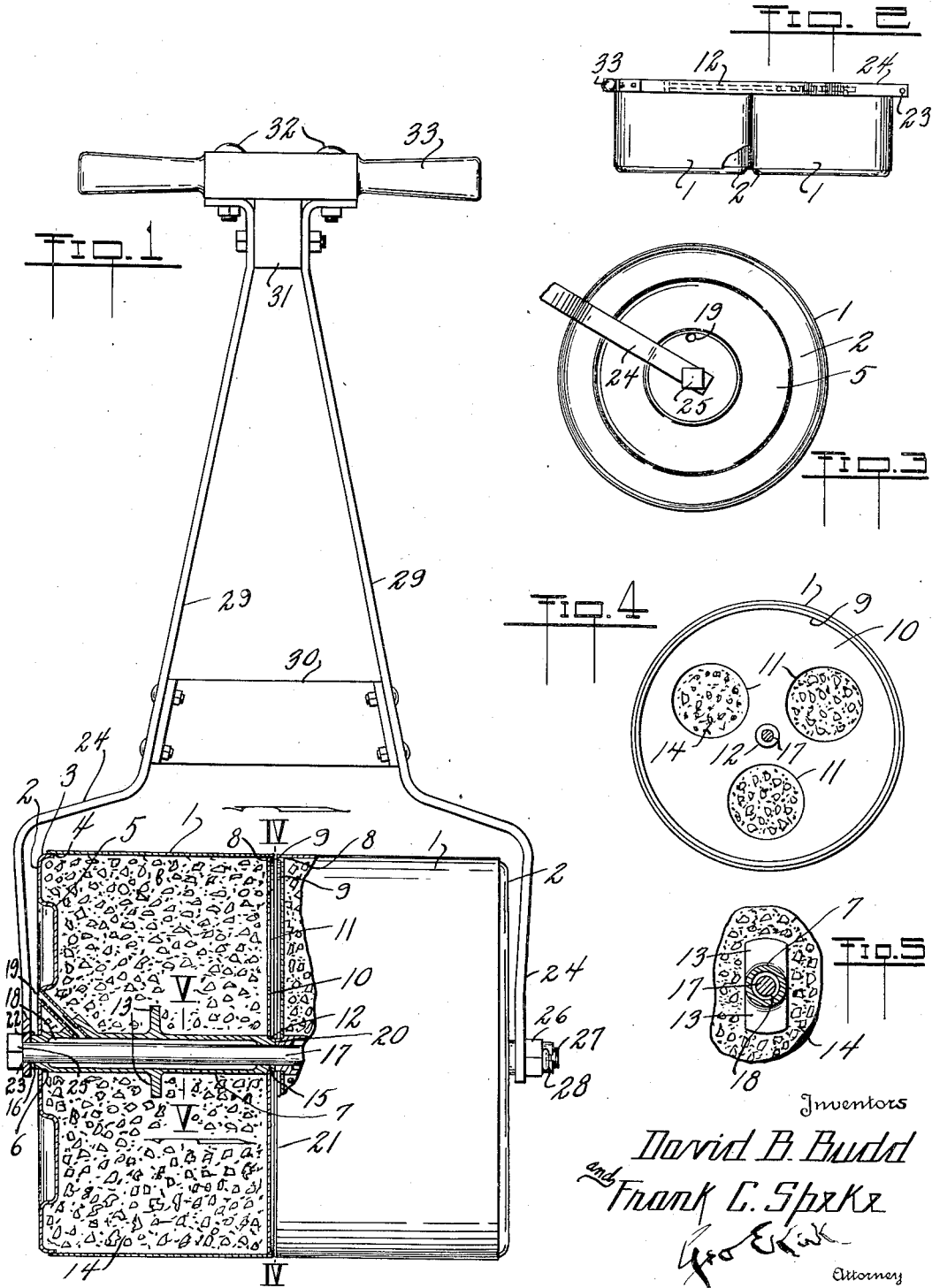
Inventors
David B. Budd
and
Frank C. Speke
Attorney Patented Feb. 4, 1936

2,029,518

UNITED STATES PATENT OFFICE 2,029,518

GARDEN ROLLER MANUFACTURE

David B. Budd, Anchorville, Mich., and Frank C. Speke, Toledo, Ohio

Application August 23, 1934, Serial No. 741,124

4 Claims. (Cl. 55—48)

This invention relates to pressure-applying or loaded rollers.

This invention has utility when incorporated in land or garden rollers, initially fragile, to take on permanent loaded, completed form.

Referring to the drawing:

Fig. 1 is a view, with parts broken away, of an embodiment of the invention in a two-section garden or lawn type of roller to be drawn by hand;

Fig. 2 is a group of the elements in knocked-down condition for crating or shipment;

Fig. 3 is an end elevation of the set up roller, with parts broken away;

Fig. 4 is a section on the line IV—IV, Fig. 1; and

Fig. 5 is a section on the line V—V, Fig. 1.

In carrying out the invention herein, relatively fragile, light gage mold is produced to receive the loading. To this end there is provided herein tread 1 of general cylindrical form which may have its ends welded together as a continuous cylindrical portion. Marginally this portion is reinforced by end pieces, herein shown as end piece 2 having curved corner 3 to have spot weld assembly 4 as a stiffening for an edge of the tread 1. Intermediate stiffening 5 for this outer tread 1. Intermediate stiffening 5 for this outer terminus of the mold extends inward to opening 6 as a centering for hub 7. The remote end of this drum or cylindrical portion 1 may have spot weld assembly 8 with outwardly extending flange 9 for end piece 10 opposing the end piece 2.

While the end piece 2 is of general complete form as a mold closure, the end piece 10 has open-work portions 11 therein. This portion 10 extends inward to central opening 12, aligned with the opening 6, in thus providing effective centering for the hub 7, herein shown as having fins or wings 13 as keying means against relative rotation and angular shifting of plastic mass 14.

However, in setting up this structure as factory produced, the tread 1 has the end pieces 2, 10, assembled therewith at the weld portions 4, 8, in completing the shell or mold having the large filling openings 11. The hub 7 is shown with terminal bearing portions 15, 16, through which may extend bolt 17 as an axle. With this axle in the hub there is, between the bearings 15, 16, chamber 18 with which duct 19 is in communication, thereby providing a lubricant chamber which may be charged through the duct 19 as antifrictional to the motion between the axle 17 and the hub 7 in the relative rotation therebetween. The hub 7 extends beyond the end portions 2, 10. At the end portion 10 this extension 20 is partial spacing means relatively to companion roller section and providing clearance 21 therebetween. In the instance that these rollers are say 14 to 16 inches in diameter and 8 to 10 inches long, this clearance space may be ⅛ to ¼ of an inch, and the loaded tool have weight of upward of 200 pounds when the plastic filler or cast 14 is of concrete.

Terminus or extension 22 of the hub 6 is engaged by eye 23 of yieldable arm 24 sprung inward to be engaged by head 25 of the bolt 17. Companion arm 24 of the handle has its eye about the bolt 17 and engaged by nut 26 and threaded portion 27 of the bolt 17 into effective gripping relation for the arms 24 and there anchored by key 28 so that the axle 17 is fixed with the arms 24 of the handle and rotation is between the axle 17 and the hubs 7, whether there be the multiple even beyond two of such sections on the axle 17. These arms 24 are flexed slightly into this gripping position with the axle. The arms 24 extend to convergent portions 29 having rigid spacer plate 30 toward the roller and block 31 at their ends, where there is assembled therewith by bolts 32, handle 33.

In manufacture, the handle assembly is completed. The bolt or axle may be independent and the relatively fragile molds or casting forms 1, 2, 10, assembled as to the complete casting form. However, in practice these are made up with as light as twenty gage sheet metal, thereby primarily serving as a form. However, as reinforced with a concrete filler or casting, these relatively fragile, light weight casting forms take on substantial attributes as a reinforced and loaded complete land roller having garden smoothing and clod crushing properties with efficient wear. The second roller renders the tool one which may be conveniently angularly shifted by hand even at its mass of the loading.

Value herein follows not only from the simplicity in the light weight symmetrical form for the roller skeleton or uncharged section, but that in such form it may be readily transported to a place of retailing or use in order that at such destination, which may be more or less remote from the metal working factory, there may be a charging with the weight mass. This means economy in transportation with a product, as thus simply completed at destination, independent of any extra molds or forms. This type of device is also one which is readily made up at the factory in metal working in quantity, complete and ready for marketing, and even marketing for retail at the factory, for the rollers, as skeleton produced, may be there charged when convenient with the plastic or concrete mass for setting and at once installed in the completed tool.

It is thus seen that as the light skeleton structure is to be completed as a roller, it is only necessary to lay the sections on the ends 2 and make the pours through the openings 11. Such pour is clear of affecting the axle. The end pieces center the hub at both termini. The form is determined by the tread between end pieces 2, 10, and the end piece 10 determines the extent of fill. It also is of such extent that the tread 1 is reinforced at the end pieces. There is sufficient amount of web at the end piece 10 that occasion for breaking out of the concrete mass or casting 14 does not arise even under rough usage.

Furthermore, this concrete exposure is not terminally of the set up roller sections, but as to such regions there is complete armoring at the end pieces 2 even if of a wide gage, for they are reinforced by the cement backing or filler. The clearance between the roll sections is not such that attack of the exposed concrete may occur therethrough but there is such clearance that relative freedom of rotation may occur as to the roll sections, especially in making turns of the tool. By the term handle is meant the draft member adapted for pushing or pulling the tool.

What is claimed and it is desired to secure by Letters Patent is:

1. A garden roller section comprising a tread, end pieces, a hub centered by the end pieces, one of said end pieces having opening means for pouring of a cast therein, said hub having key projection means to cooperate with the cast, an axle having spaced bearings terminally of the hub, said spaced bearings of the axle and hub providing a lubricant chamber along the axle for the bearings, a duct through an end piece to said chamber, and a roller propelling handle fixed with the axle.

2. A garden roller comprising aligned roller sections, each section having a hub protruding for spacing the sections, and an axle through the hubs to provide a propelling handle fixed with the axle termini, each section as away from the axle termini having hub centering means, a tread for the section reinforced by the centering means, said centering means having open work between the hub and tread to provide concrete cast pouring opening means adapted to receive a plastic charge when at destination for use, in that the uncharged section may be an effective mold to be then loaded.

3. A garden roller section comprising a tread, end pieces, a hub centered by the end pieces, one of said end pieces having opening means for pouring of a load into the section; said hub having means to cooperate with the load and through the tread, end pieces and hub providing holding means for the load; an axle having spaced bearings terminally of the hub, said spaced bearings of the axle and hub providing a lubricant chamber isolated from the load and along the axle for the bearings, a duct through an end piece to said chamber, and a roller propelling handle fixed with the axle.

4. A garden roller comprising aligned roller sheet metal sections, each section having a hub protruding for spacing the sections, and an axle through the hubs to provide a propelling handle fixed with the axle termini, each section as away from the axle termini having disk means, a tread for the section reinforced by the centering means, said centering means having an opening between the hub and tread through which the section is adapted to receive a load when at destination for use, in that the uncharged section may be an effective load holder to be then loaded.

DAVID B. BUDD.
FRANK C. SPEKE.